(12) United States Patent
Higuchi

(10) Patent No.: US 8,508,666 B2
(45) Date of Patent: Aug. 13, 2013

(54) MOVING IMAGE PROCESSING APPARATUS, AND CONTROL METHOD AND PROGRAM THEREOF

(75) Inventor: Shugo Higuchi, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 49 days.

(21) Appl. No.: 12/961,382

(22) Filed: Dec. 6, 2010

(65) Prior Publication Data

US 2011/0141367 A1    Jun. 16, 2011

(30) Foreign Application Priority Data

Dec. 11, 2009    (JP) .................................. 2009-282294

(51) Int. Cl.
*H04N 5/57*    (2006.01)
*H04N 5/58*    (2006.01)

(52) U.S. Cl.
USPC ........ 348/602; 348/603; 348/227.1; 348/673; 348/687; 345/207; 345/690; 382/274

(58) Field of Classification Search
USPC .............. 348/602, 603, 227.1, 254, 673, 672, 348/687; 345/207, 690; 382/274; 358/518, 358/520
See application file for complete search history.

(56) References Cited

U.S. PATENT DOCUMENTS 8,165,417 B2 *    4/2012    Yamashita et al. ............ 382/274
2006/0007108 A1    1/2006    Utsumi et al.

FOREIGN PATENT DOCUMENTS

| JP | 06-083287 A | 3/1994 |
|----|-------------|--------|
| JP | 2006-039520 A | 2/2006 |
| JP | 2007-248936 A | 9/2007 |

* cited by examiner

*Primary Examiner* — Jefferey Harold
*Assistant Examiner* — Jean W Desir
(74) *Attorney, Agent, or Firm* — Canon USA Inc. IP Division

(57) ABSTRACT

A moving image processing apparatus includes a brightness information acquisition unit configured to acquire, from an input video signal, brightness information indicating brightness of the video signal, an illumination information acquisition unit configured to acquire illumination information about an environment of the moving image processing apparatus, an adaptation coefficient calculation unit configured to calculate an adaptation coefficient for an observer based on brightness when the brightness indicated by the brightness information is less than a first threshold and the brightness indicated by the illumination information is less than a second threshold, a correction coefficient calculation unit configured to calculate a correction coefficient to be used for image correction of the video signal based on the adaptation coefficient calculated by the adaptation coefficient calculation unit, and an image correction unit configured to perform image correction on the video signal using the correction coefficient calculated by the correction coefficient calculation unit.

6 Claims, 11 Drawing Sheets

MOVING IMAGE PROCESSING APPARATUS, AND CONTROL METHOD AND PROGRAM THEREOF

BACKGROUND OF THE INVENTION

1. Field of the Invention

The present invention relates to a method for, in a moving image processing apparatus which displays moving images, improving gradation correction during low illuminance and low luminance, by giving consideration to human visual features in a dark place.

2. Description of the Related Art

Conventionally, to improve image quality and visibility, a known technology is to adaptively control the contrast and brightness of a video signal and the display luminance and color signals of a display device based on the display contents of an image signal and the brightness of the surrounding environment of the viewer.

For example, Japanese Patent Application Laid-Open No. 06-83287 discusses a method for improving visibility by automatically controlling both or only one of the amplitude and an operation reference level of an applied video signal to a liquid crystal panel, based on a brightness control signal from an ambient light sensor or the like.

Further, Japanese Patent Application Laid-Open No. 2007-248936 discusses a method for improving image quality and visibility by performing image correction by giving consideration to various image characteristics, even for when the input signal is a computer graphics (CG) image or natural moving images on television.

In addition, Japanese Patent Application Laid-Open No. 2006-039520 discusses a method for maintaining color purity from low luminance to high luminance by controlling the amount of light from a light source (backlight) based on the brightness of an image signal to reduce color tone change between gradations.

However, for a conventional moving image processing apparatus, in an environment in which the illumination is turned down, when images having a low average luminance, such as those in a movie, are viewed, the color tone and gradation are perceived to gradually change, because not enough consideration is given to the human visual features in a dark place. This is because in order for a human sensory system to deal with various environments, the sensory system has a function that changes the sensitivity to that environment. For example, when a person first enters a movie theater while a movie is being played, the theater appears pitch dark and the person cannot see anything. However, after some time has elapsed, the person can see his/her surroundings quite well. This is because the person's sensitivity to light has changed. This phenomenon is called "dark adaptation". Although the time required for dark adaptation differs between the retina center and peripheral vision, the discernible luminance at 5° from the retinal periphery decreases over time. After about 30 minutes, the discernible luminance becomes constant. Conversely, during switching from a dark place to a bright place, the discernible luminance becomes constant in about 0.5 seconds.

Further, during switching from a bright image to a dark image, the observer senses a blue hue over time, and conversely, during switching from a dark image to a bright image, the observer senses a red hue over time. This phenomenon is called "Purkinje shift", in which the sensitivity of the human eye tends to shift from red to blue as the brightness becomes darker. Consequently, for a moving image processing apparatus whose white balance was set using a bright image, during switching from a bright image to a dark image, the image is perceived over time as a bluish image with an unbalanced white balance.

In addition, during switching from a bright environment to a dark environment, the perceived gradation characteristics of the human eye soften (look brighter), while during switching from a dark environment to a bright environment, the perceived gradation characteristics of the human eye harden (look darker). This phenomenon is called the "Bartleson-Breneman effect", in which the human eye tends to sense an identical light stimulus more brightly if the periphery is darkened. Consequently, for a moving image processing apparatus whose white balance was set using a bright image, during switching from a bright environment to a dark environment, the image is perceived over time as an image with an unbalanced gradation balance.

Since the liquid crystal display control apparatus discussed in Japanese Patent Application Laid-Open No. 06-83287 is directed only to improving visibility in bright places, this apparatus does not provide any improvements for visibility or image quality in dark places.

Although the moving image processing apparatus discussed in Japanese Patent Application Laid-Open No. 2007-248936 adjusts white balance based on a Purkinje luminosity function, since no consideration is given to the time required for adaptation, this apparatus cannot flexibly handle scene changes or changes in the observation environment.

Further, similarly, the method discussed in Japanese Patent Application Laid-Open No. 2006-039520 also cannot flexibly handle scene changes or changes in the observation environment, because it does not give consideration to the time required for adaptation.

SUMMARY OF THE INVENTION

The present invention is directed to a moving image processing apparatus that is capable of realizing stable visibility even in a dark place, by giving consideration to the visual features in the dark place and to the time required for dark adaptation.

According to an aspect of the present invention, a moving image processing apparatus includes a brightness information acquisition unit configured to acquire, from an input video signal, brightness information indicating brightness of the video signal, an illumination information acquisition unit configured to acquire illumination information about an environment of the moving image processing apparatus, an adaptation coefficient calculation unit configured to calculate an adaptation coefficient for an observer based on brightness when the brightness indicated by the brightness information is less than a first threshold and the brightness indicated by the illumination information is less than a second threshold, a correction coefficient calculation unit configured to calculate a correction coefficient to be used for image correction of the video signal based on the adaptation coefficient calculated by the adaptation coefficient calculation unit, and an image correction unit configured to perform image correction on the video signal using the correction coefficient calculated by the correction coefficient calculation unit.

According to an exemplary embodiment of the present invention, stable visibility can be realized even in a dark place, since consideration is given to the visual features in the dark place and to the time required for dark adaptation.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
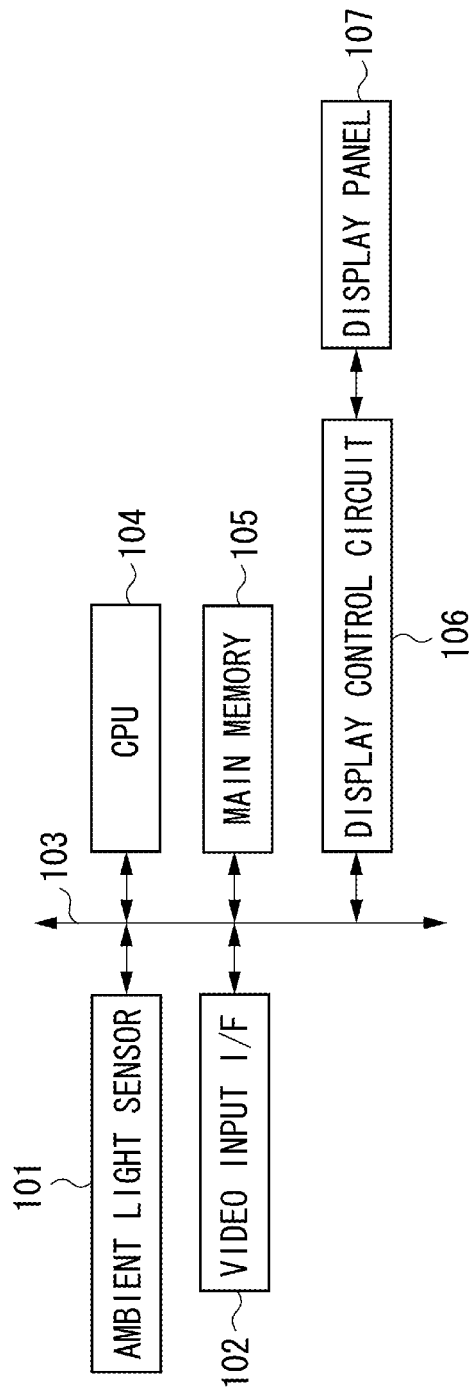
FIG. 1 is a block diagram illustrating a system configuration example of a moving image processing apparatus according to an exemplary embodiment of the present invention.

FIG. 1 is a block diagram illustrating a system configuration example of a moving image processing apparatus according to an exemplary embodiment of the present invention. The moving image processing apparatus includes an ambient light sensor 101, a video input interface (I/F) 102, a system bus 103, a central processing unit (CPU) 104, a main memory 105, a display control circuit 106, and a display panel 107.

Figure 2:
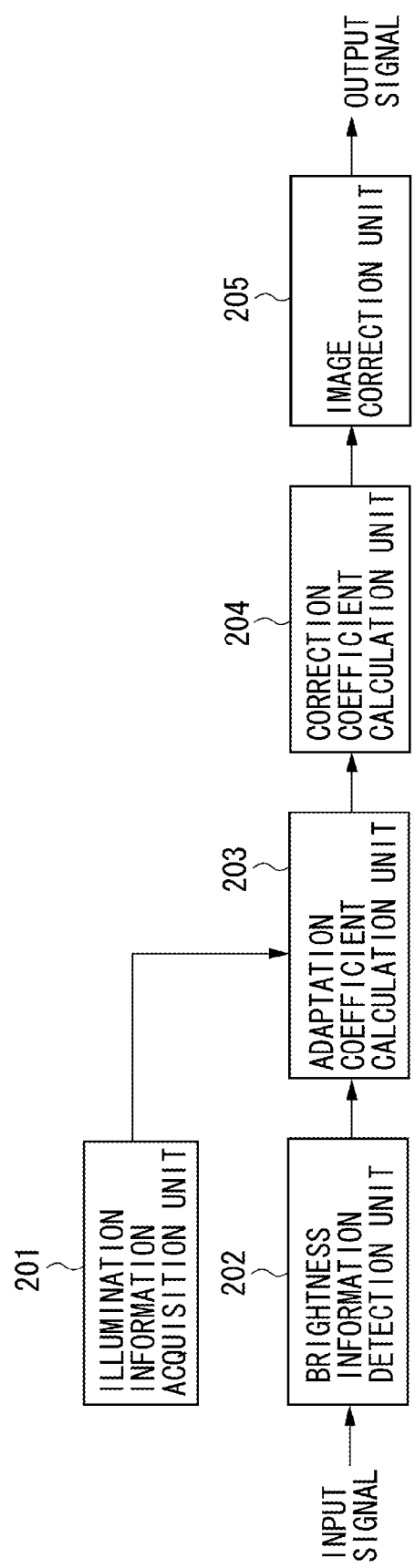
FIG. 2 is a block diagram of a moving image processing apparatus according to an exemplary embodiment of the present invention.

The moving image processing apparatus having the above-described configuration will be described using FIG. 2. An illumination information acquisition unit 201 is configured from the ambient light sensor 101. Acquired illumination information is stored in the main memory 105 via the system bus 103. A brightness information detection unit 202 is configured from the video input I/F 102 and the CPU 104. The CPU 104 acquires brightness information for each frame in a video signal input from the video input I/F 102. Further, the acquired brightness information is stored in the main memory 105 via the system bus 103. An adaptation coefficient calculation unit 203 is configured from the CPU 104. Using the illumination information and the brightness information stored in the main memory 105, the adaptation coefficient calculation unit 203 calculates an adaptation coefficient. The calculated adaptation coefficient is stored in the main memory 105 via the system bus 103. A correction coefficient calculation unit 204 is configured from the CPU 104. Using the illumination information, the brightness information, and the adaptation coefficient stored in the main memory 105, the correction coefficient calculation unit 204 calculates a correction coefficient. The calculated correction coefficient is stored in the main memory 105 via the system bus 103. An image correction unit 205 is configured from the display control circuit 106. The image correction unit 205 performs image correction using the correction coefficient stored in the main memory 105.

Figure 3:
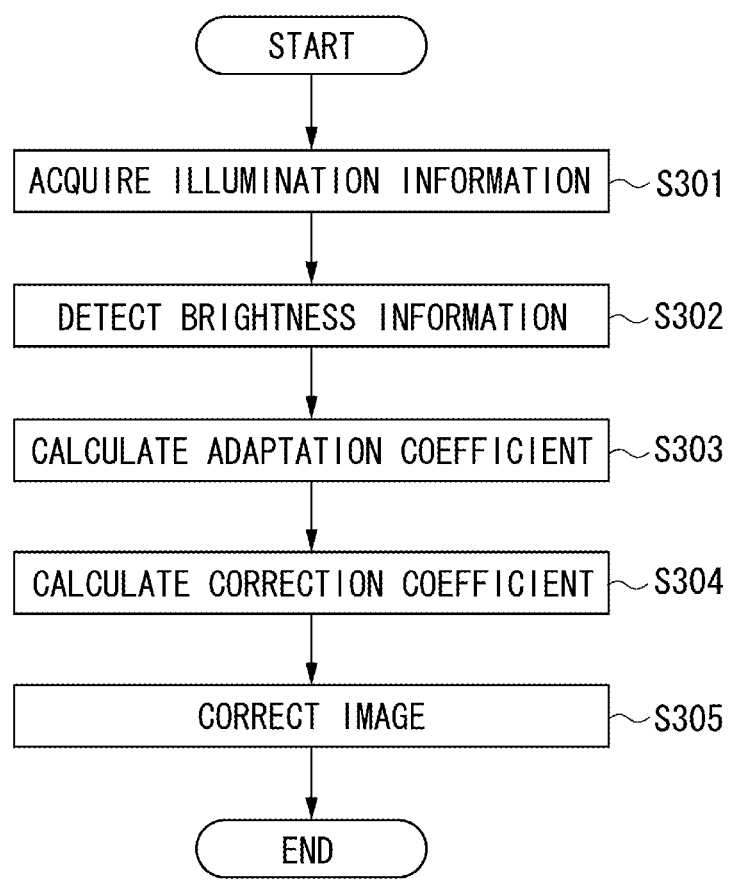
FIG. 3 is a flowchart illustrating processing performed in a moving image processing apparatus according to an exemplary embodiment of the present invention.

FIG. 3 is a flowchart illustrating a processing flow in the moving image processing apparatus.

In step S301, the illumination information acquisition unit 201 acquires illumination information. The illumination information is formed based on illumination illuminance around the moving image processing apparatus (especially, the display panel 107). Although this illumination information is information that is acquired in real time, the illumination information may be information acquired in response to a user instruction or during startup. Further, the illumination information may also include chromaticity information in addition to illumination illuminance. The chromaticity information may be xy plane values, uv plane values, u'v' plane values, or the XYZ stimulus values themselves.

In step S302, the brightness information detection unit 202 calculates brightness information for each frame in an input video signal. The brightness information may be information indicating the brightness of the input video signal. Alternatively, the brightness information may be information indicating a maximum luminance level of a luminance histogram obtained by calculating a luminance histogram for each scene based on a known method.

Figure 4:
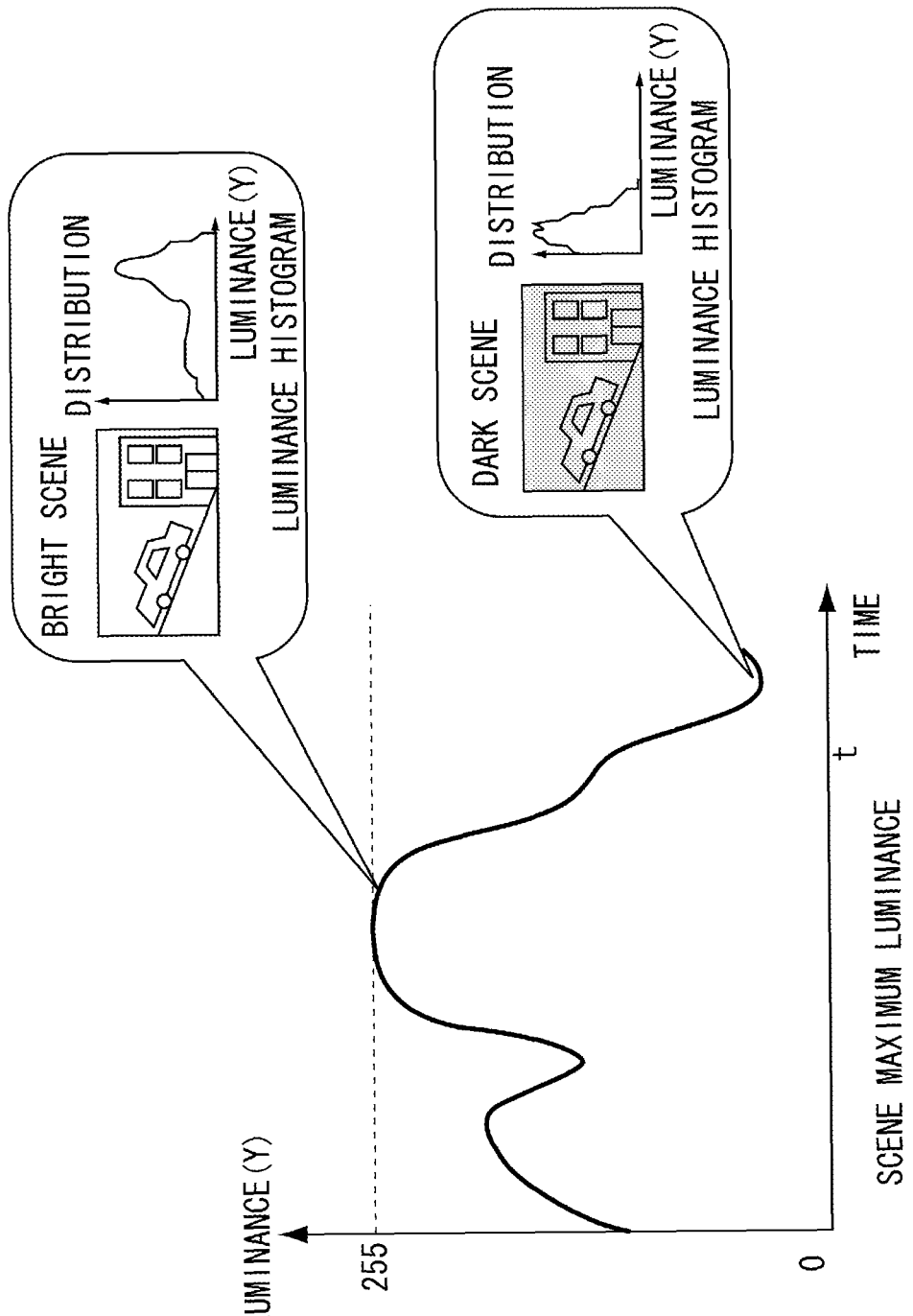
FIG. 4 illustrates a brightness information acquisition method according to an exemplary embodiment of the present invention.

FIG. 4 illustrates a brightness information acquisition method. As illustrated in FIG. 4, a luminance histogram is calculated by performing scene analysis for each predetermined time period. The maximum value in the luminance histogram calculated at this stage is acquired as the brightness information. Further, the method for acquiring brightness information may be performed using not only the maximum luminance level, but may also use a luminance level average or a weighted value of the luminance level. In addition, the brightness information detection unit 202 may extract already-calculated video signal brightness information.

In step S303, the adaptation coefficient calculation unit 203 calculates an adaptation coefficient for the observer based on the brightness using the illumination information acquired in step S301 and the brightness information calculated in step S302. The processing flow of the adaptation coefficient calculation will be described below.

In step S304, the correction coefficient calculation unit 204 calculates a correction coefficient using the illumination information acquired in step S301, the brightness information calculated in step S302, and the adaptation coefficient calculated in step S303. The processing flow of the correction coefficient calculation will be described below.

In step S305, the image correction unit 205 performs image correction based on the correction coefficient calculated in step S304. The processing flow of the image correction will be described below.

Figure 5:
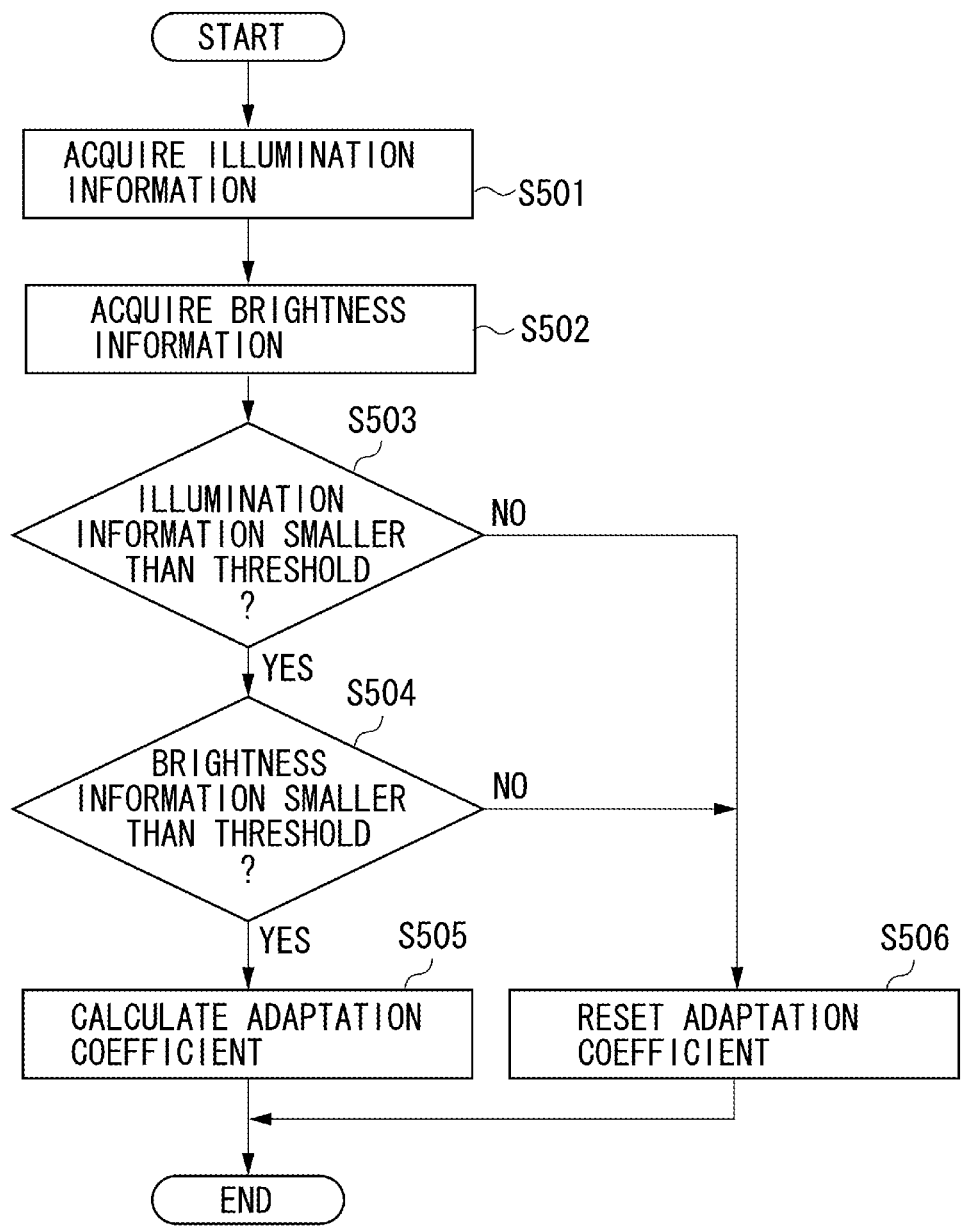
FIG. 5 is a flowchart illustrating adaptation coefficient calculation processing according to an exemplary embodiment of the present invention.

FIG. 5 is a flowchart illustrating an adaptation coefficient calculation processing flow.

In step S501, the adaptation coefficient calculation unit 203 acquires the illumination information acquired in step S301.

In step S502, the adaptation coefficient calculation unit 203 acquires the brightness information acquired in step S302.

In step S503, the adaptation coefficient calculation unit 203 determines whether the illumination information acquired in step S501 is smaller than a predetermined threshold (first threshold). If the illumination information is smaller than the predetermined threshold (YES in step S503), the processing proceeds to step S504. If the illumination information is larger than or equal to the predetermined threshold (NO in step S503), the processing proceeds to step S506. The threshold may be pre-stored in the main memory, or may be set by the user.

In step S504, the adaptation coefficient calculation unit 203 determines whether the brightness information acquired in step S502 is smaller than a predetermined threshold (second threshold). If the illumination information is smaller than the predetermined threshold (YES in step S504), the processing proceeds to step S505. If the illumination information is larger than or equal to the predetermined threshold (NO in step S504), the processing proceeds to step S506. The threshold may be pre-stored in the main memory, or may be set by the user.

In step S505, the adaptation coefficient calculation unit 203 calculates an adaptation coefficient k(t) based on the illumination information and the brightness information.

Figure 6:
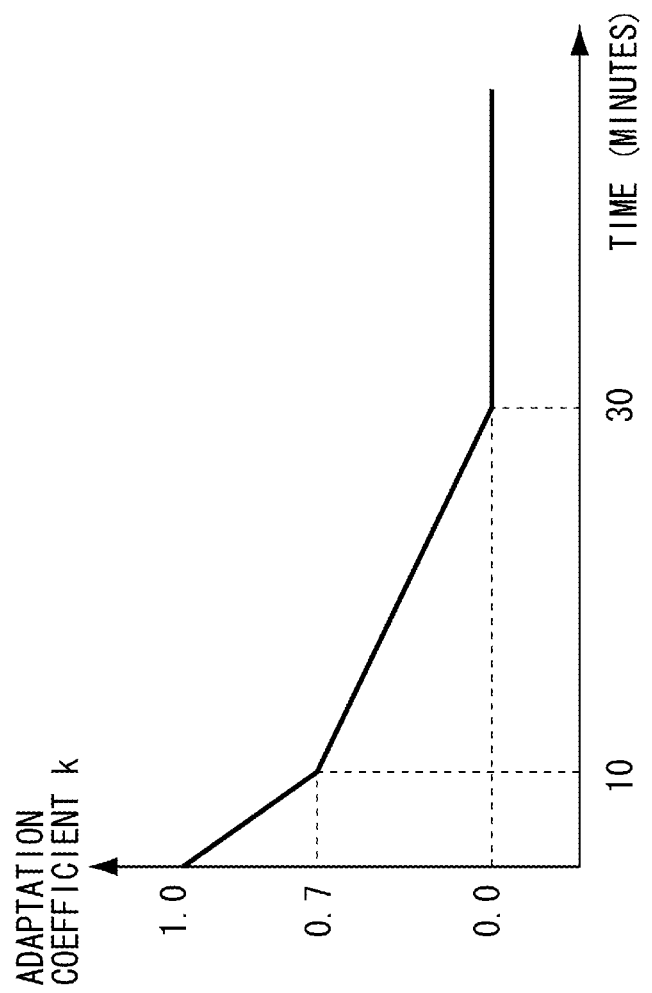
FIG. 6 illustrates a method for calculating an adaptation coefficient in a dark place according to an exemplary embodiment of the present invention.

FIG. 6 illustrates a method for calculating the adaptation coefficient in a dark place. Based on a time at which the illumination information becomes smaller than the first threshold and the brightness information becomes smaller than the second threshold as a reference, the human eye has the characteristic that after the minimum perceivable luminance settles down in about 10 minutes, the minimum perceivable luminance gradually decreases for about another 20 minutes.

Based on this visual feature, the adaptation coefficient is calculated using a function in which the adaptation coefficient to be calculated decreases during a period until a predetermined time elapses. For example, the adaptation coefficient is calculated using the following equation (1).

$$k(t)=1-0.03t(0<t<10)$$

$$k(t)=1.05-0.035t(10<t<30)$$

$$k(t)=0(30<t) \quad (1)$$

Here, the variable t is the duration (minutes) that the processing in step S505 is performed for. When the processing proceeds to step S506, this variable is reset to zero.

In the present exemplary embodiment, the adaptation coefficient is obtained based on a sensitivity characteristic in dark adaptation. However, the adaptation coefficient may also be obtained using a different parameter. For example, the adaptation coefficient may be calculated using a monotonically decreasing equation, such as the following equation (2).

$$k(t)=1-1/n*t(0<t<n)$$

$$k(t)=0(n<t) \quad (2)$$

Here, n denotes the dark adaptation time (minutes).

Further, rather than being calculated based on an equation, the adaptation coefficient may be derived based on a conversion table, such as a correspondence table, pre-stored in the main memory. In step S506, the adaptation coefficient calculation unit 203 resets the adaptation coefficient to a predetermined value. The set value may be pre-stored in the main memory, or may be set by the user. In this example, the adaptation coefficient is set to zero.

Figure 7:
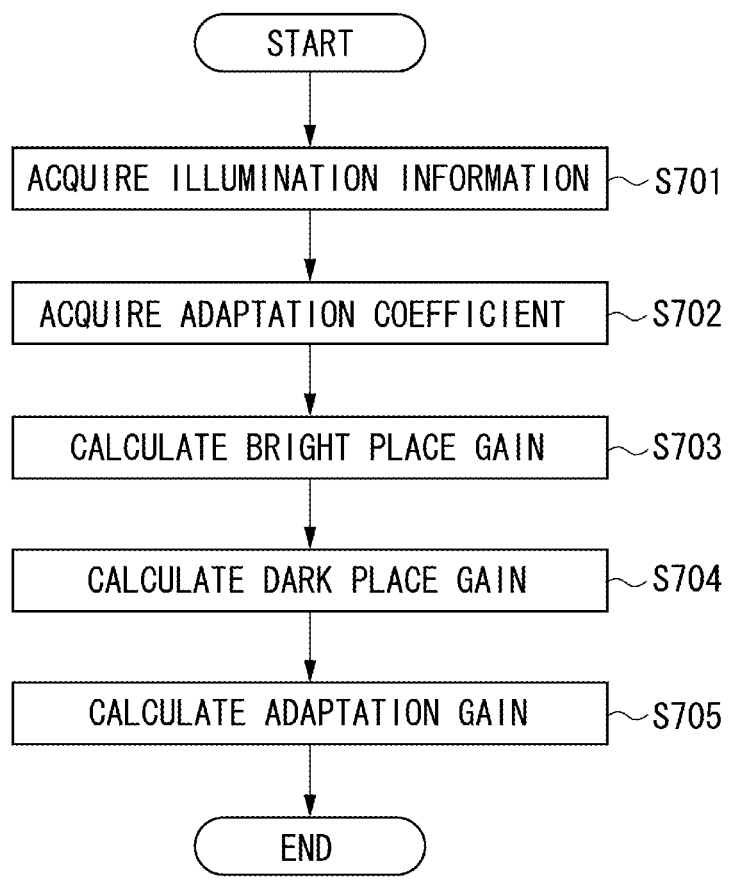
FIG. 7 is a flowchart illustrating correction coefficient calculation processing according to an exemplary embodiment of the present invention.

FIG. 7 is a flowchart illustrating a correction coefficient calculation processing flow.

In step S701, the correction coefficient calculation unit 204 acquires the illumination information acquired in step S301. In step S702, the correction coefficient calculation unit 204 acquires the adaptation coefficient k(t) calculated in step S303.

In step S703, the correction coefficient calculation unit 204 calculates a bright place gain K1 based on the illumination information. The bright place gain may also be derived based on a conversion table, such as a correspondence table, pre-stored in the main memory. In addition, the bright place gain may be pre-stored in the main memory, or may be set by the user. In this example, the bright place gain is set to 1.0.

In step S704, the correction coefficient calculation unit 204 calculates a dark place gain K2 based on the illumination information. The thus-calculated correction coefficient is at least one or more correction coefficients from among a gamma correction coefficient, a luminance gain coefficient, and an RGB gain coefficient.

Figure 8:
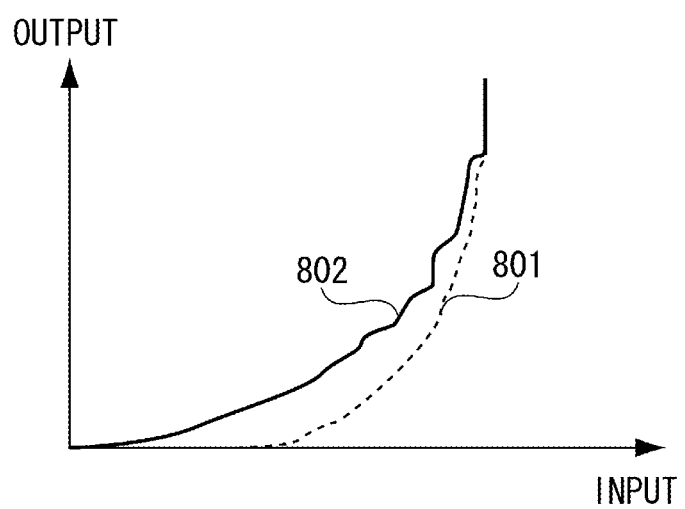
FIG. 8 illustrates a method for calculating a gamma correction coefficient according to an exemplary embodiment of the present invention.

FIG. 8 illustrates a method for calculating the gamma correction coefficient. This calculation method uses a perceived gamma characteristic 801 in a bright environment and a perceived gamma characteristic 802 in a dark environment. According to the above-described Bartleson-Breneman effect, the ratio between the gamma characteristic perceived in a bright environment and the gamma characteristic perceived in a dark environment is 1:1.5.

Based on this visual feature, for example, the gamma correction coefficient dark place gain is calculated using the following equation (3).

$$K2=-0.05*l+1.5(0<l<10)$$

$$K2=1.0(10<l) \quad (3)$$

Here, the variable "l" is the illumination information acquired in step S701, and the unit thereof is luminance (cd/m$^2$).

Figure 9:
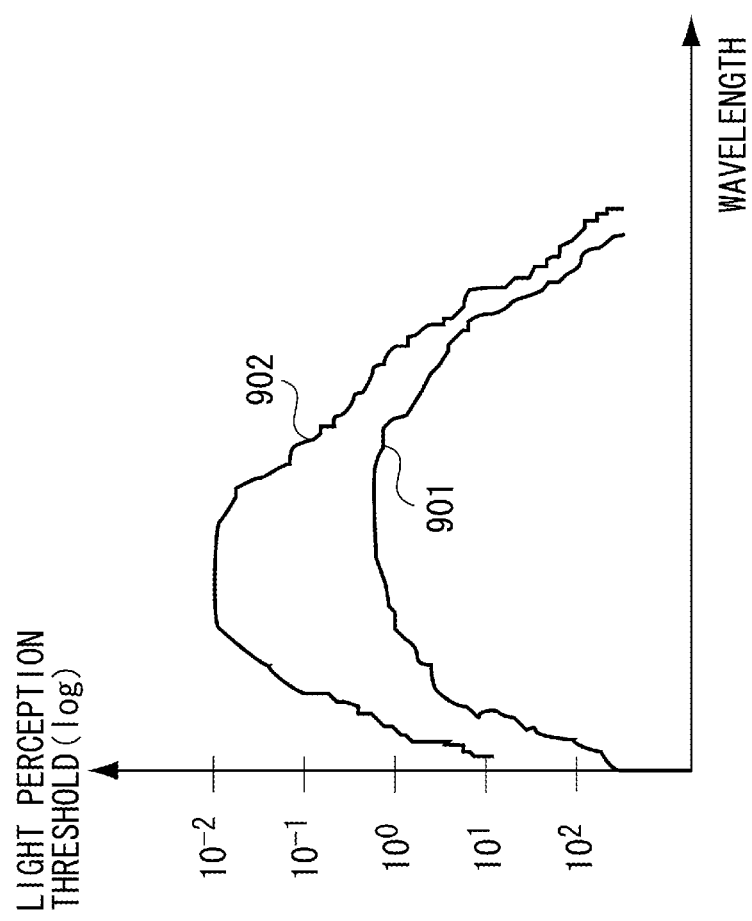
FIG. 9 illustrates a method for calculating a luminance gain correction coefficient according to an exemplary embodiment of the present invention.

FIG. 9 illustrates a method for calculating the luminance gain correction coefficient. This calculation method uses a minimum luminance 901 that can be perceived in a bright environment and a minimum luminance 902 that can be perceived in a dark environment. According to FIG. 9, the ratio between the minimum luminance that can be perceived in a bright environment and the minimum luminance that can be perceived in a dark environment is 100:1. Based on this visual feature, for example, the luminance gain correction coefficient dark place gain is calculated using the following equation (4).

$$K2=0.099*l+0.01(0<l<10)$$

$$K2=1.0(10<l) \quad (4)$$

Figure 10:
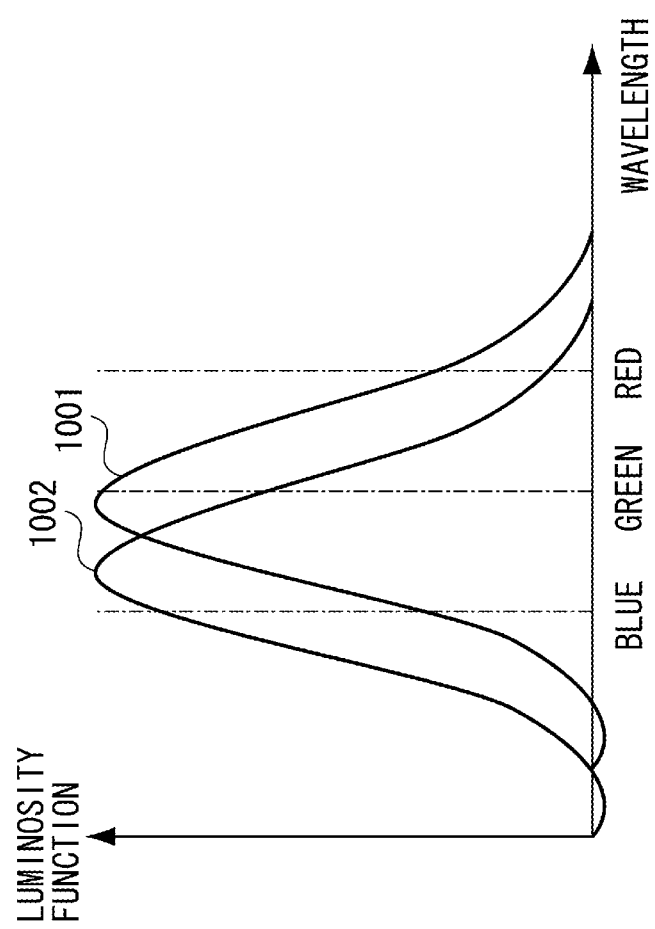
FIG. 10 illustrates a method for calculating an RGB gain correction coefficient according to an exemplary embodiment of the present invention.

FIG. 10 illustrates a method for calculating an RGB gain correction coefficient. This calculation method uses a luminosity function curve 1001 in a bright environment and a luminosity function curve 1002 in a dark environment. According to the above-described Purkinje phenomenon, the luminosity function that can be perceived at each wavelength is different. For the red wavelength, the ratio between the luminosity function that can be perceived in a bright environment and the luminosity function that can be perceived in a dark environment is 0.6:0.1. Further, for the green wavelength, the ratio between the luminosity function that can be perceived in a bright environment and the luminosity function that can be perceived in a dark environment is 1.0:0.4. For the blue wavelength, the ratio between the luminosity function that can be perceived in a bright environment and the luminosity function that can be perceived in a dark environment is 0.16:0.8.

Based on this visual feature, for example, the RGB gain correction coefficient dark place gain is calculated using the following equation (5).

$$K2\_R = -0.5*l + 6.0 \ (0 < l < 10)$$

$$K2\_G = -0.15*l + 2.5 \ (0 < l < 10)$$

$$K2\_B = 0.08*l + 0.2 \ (0 < l < 10)$$

$$K2 = 1.0 \ (10 < l) \quad (5)$$

Here, $K2\_R$, $K2\_G$, and $K2\_B$ are the gain coefficients for the R, G, and B color signals, respectively. In the present exemplary embodiment, the adaptation coefficient is obtained based on a sensitivity characteristic in dark adaptation. However, the adaptation coefficient may also be obtained using a different parameter. In addition, rather than being calculated from an equation, the dark place gain may also be derived based on a conversion table, such as a correspondence table, pre-stored in the main memory.

In step S705, the correction coefficient calculation unit 204 calculates an adaptation gain K from the bright place gain and the dark place gain, based on the adaptation coefficient. The adaptation gain may be, for example, calculated using the following equation (6).

$$K = k(t)*K1 + (1 - k(t))*K2 \quad (6)$$

Figure 11:
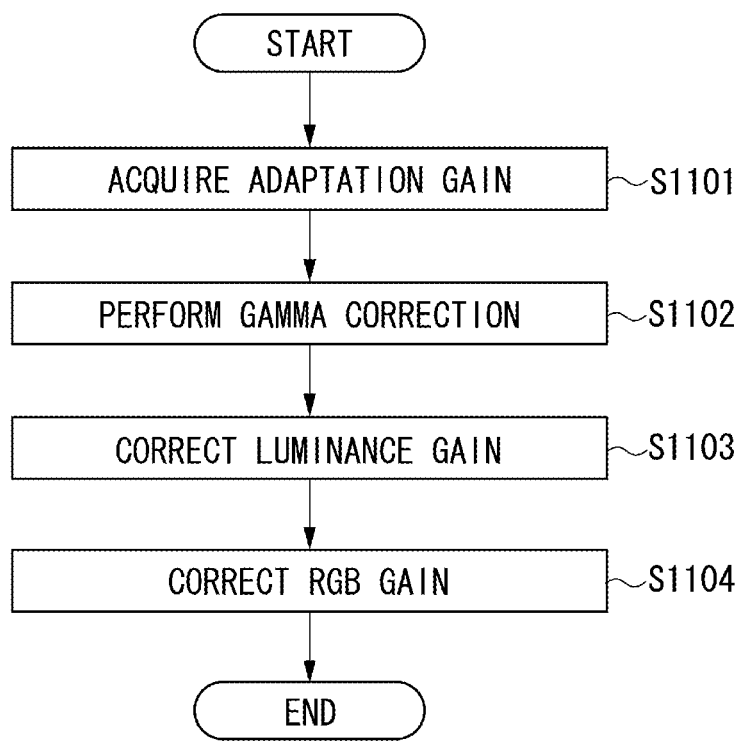
FIG. 11 is a flowchart illustrating image correction processing according to an exemplary embodiment of the present invention.

FIG. 11 is a flowchart illustrating a processing flow of image correction. In step S1101, the image correction unit 205 acquires the adaptation gain calculated in step S304. In step S1102, the image correction unit 205 performs gamma correction based on the adaptation gain of the gamma correction coefficient. In gamma correction, the luminance level of the input signal is raised by the power of the gamma coefficient.

In step S1103, the image correction unit 205 performs luminance gain correction based on the adaptation gain of the luminance gain correction coefficient. In luminance gain correction, the luminance level of the input signal is multiplied by the luminance gain coefficient.

In step S1104, the image correction unit 205 performs RGB gain correction based on the adaptation gain of the RGB gain correction coefficient. In RGB gain correction, the RGB input signals are multiplied by the respective RGB gain coefficients.

Thus, the present exemplary embodiment can improve visibility even in a dark place, since image correction is performed based on a correction coefficient calculated by giving consideration to the visual features in the dark place and to the time required for dark adaptation.

The present invention may be applied in an apparatus configured from a plurality of devices (e.g., a host computer, an interface device, a reader, a printer, etc.), as well as in an apparatus configured from one device (e.g., a copying machine, a facsimile apparatus, etc.).

The present invention is also achieved by supplying a storage medium, on which a computer program code for realizing the above-described functions is recorded, to a system, and having this system read and execute the computer program code. In this case, the storage medium storing this computer program code, wherein the computer program code itself, which is read from the storage medium, executes the functions of the above-described exemplary embodiments, constitutes the present invention. Further, the present invention also includes cases in which, based on an instruction from that program code, the operating system (OS), etc., running on the computer performs part or all of the actual processing, and the above-described functions are realized based on that processing.

Further, the present invention may also be realized by the following exemplary embodiments. Specifically, the computer program code read from the storage medium may be written in a memory provided on a function expansion card inserted into a computer or a function expansion unit connected to the computer. Based on an instruction of that computer program code, a CPU or the like provided on the function expansion card or function expansion unit performs part or all of the actual processing, and the above-described functions are executed.

If applying the present invention to the above-described storage medium, that storage medium stores a computer program code corresponding to the flowcharts described above.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-282294 filed Dec. 11, 2009, which is hereby incorporated by reference herein in its entirety.

What is claimed is:

1. A moving image processing apparatus comprising:
    a brightness information acquisition unit configured to acquire, from an input video signal, brightness information indicating brightness of the video signal;
    an illumination information acquisition unit configured to acquire illumination information about an environment of the moving image processing apparatus;
    an adaptation coefficient calculation unit configured to calculate an adaptation coefficient for an observer based on brightness when the brightness indicated by the brightness information is less than a first threshold and the brightness indicated by the illumination information is less than a second threshold;
    a correction coefficient calculation unit configured to calculate a correction coefficient to be used for image correction of the video signal based on the adaptation coefficient calculated by the adaptation coefficient calculation unit; and
    an image correction unit configured to perform image correction on the video signal using the correction coefficient calculated by the correction coefficient calculation unit.

2. The moving image processing apparatus according to claim 1, wherein the adaptation coefficient calculation unit is configured to calculate the adaptation coefficient using a function in which the adaptation coefficient to be calculated decreases during a period until a predetermined time elapses, using as a reference a time at which the brightness indicated by the brightness information becomes less than the first threshold and the brightness indicated by the illumination information becomes less than the second threshold.

3. The moving image processing apparatus according to claim 1, wherein the brightness information detection unit is configured to calculate a luminance histogram based on scene analysis for each predetermined time for the input video signal and to acquire as the brightness information a maximum value in the calculated luminance histogram.

4. The moving image processing apparatus according to claim 1, wherein the correction coefficient calculation unit is configured to calculate at least one or more correction coefficients from among a gamma correction coefficient, a luminance gain coefficient, and an RGB gain coefficient based on the adaptation coefficient calculated by the adaptation coefficient calculation unit.

5. A non-transitory computer-readable storage medium storing a program that causes a computer to function as the moving image processing apparatus according to claim 1.

6. A method for controlling a moving image processing apparatus, the method comprising:
- acquiring, from an input video signal, brightness information indicating brightness of the video signal;
- acquiring illumination information about an environment of the moving image processing apparatus;
- calculating an adaptation coefficient for an observer based on brightness when the brightness indicated by the brightness information is less than a first threshold and the brightness indicated by the illumination information is less than a second threshold;
- calculating a correction coefficient to be used for image correction of the video signal based on the calculated adaptation coefficient; and
- performing image correction on the video signal using the calculated correction coefficient.

* * * * *